(12) United States Patent
Komiya et al.

(10) Patent No.: US 9,010,849 B2
(45) Date of Patent: Apr. 21, 2015

(54) FRONT SUBFRAME STRUCTURE FOR AUTOMOTIVE VEHICLE

(71) Applicant: Mazda Motor Corporation, Hiroshima (JP)

(72) Inventors: Katsuyuki Komiya, Hatsukaichi (JP); Masanobu Kobashi, Aki-gun (JP); Manabu Yamamoto, Hiroshima (JP); Jun Inoue, Hiroshima (JP); Satoshi Obata, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/367,065

(22) PCT Filed: Dec. 19, 2012

(86) PCT No.: PCT/JP2012/008102
§ 371 (c)(1),
(2) Date: Jun. 19, 2014

(87) PCT Pub. No.: WO2013/094190
PCT Pub. Date: Jun. 27, 2013

(65) Prior Publication Data
US 2014/0312654 A1    Oct. 23, 2014

(30) Foreign Application Priority Data

Dec. 20, 2011 (JP) .................. 2011-278298

(51) Int. Cl.
*B62D 21/15* (2006.01)
*B62D 21/00* (2006.01)
(Continued)

(52) U.S. Cl.
CPC ............. *B62D 21/155* (2013.01); *B62D 21/11* (2013.01); *B62D 25/082* (2013.01)

(58) Field of Classification Search
USPC ............. 296/187.09, 187.1, 204, 193.09, 296/203.02; 280/784, 124.109
See application file for complete search history.

(56) References Cited

U.S. PATENT DOCUMENTS

| | | | |
|---|---|---|---|
| 5,641,180 A * | 6/1997 | Kamei et al. | 280/781 |
| 8,480,102 B2 * | 7/2013 | Yamada et al. | 280/124.109 |

(Continued)

FOREIGN PATENT DOCUMENTS

| | | |
|---|---|---|
| JP | 2005-271811 A | 10/2005 |
| JP | 2007-002857 A | 1/2007 |

(Continued)

OTHER PUBLICATIONS

International Search Report; PCT/JP2012/008102; Mar. 26, 2013.

*Primary Examiner* — Jason S Morrow
(74) *Attorney, Agent, or Firm* — Studebaker & Brackett PC (57) ABSTRACT

A front subframe structure for an automotive vehicle comprises: a pair of right and left side members each provided with an arm support member for supporting a suspension arm is mounted; a cross member disposed between the left and right side members to couple together respective locations in the side members at each of which the arm support member is provided; and an oblique member extending from central portion of the cross member, in each of right and left directions of the vehicle and obliquely rearwardly and outwardly in the vehicle width direction, wherein each of the side members has a rear end joined to a rear portion of a respective one of the oblique members, and wherein the rear portion of the oblique member is provided with a tunnel-lower-frame coupling portion couplable to a tunnel lower frame, and a floor frame attaching portion attachable to a floor frame.

9 Claims, 7 Drawing Sheets

(51) Int. Cl.
 *B62D 21/11* (2006.01)
 *B62D 25/08* (2006.01)

(56) References Cited

U.S. PATENT DOCUMENTS

| | | | |
|---|---|---|---|
| 8,851,520 B2* | 10/2014 | Goellner et al. | 280/784 |
| 2005/0212334 A1 | 9/2005 | Murata et al. | |
| 2006/0278463 A1* | 12/2006 | Anzai et al. | 180/312 |
| 2010/0264637 A1 | 10/2010 | Kosaka et al. | |
| 2011/0198889 A1* | 8/2011 | Takeshita et al. | 296/203.02 |
| 2014/0252739 A1* | 9/2014 | Otani et al. | 280/124.109 |
| 2014/0300136 A1* | 10/2014 | Garnweidner et al. | 296/187.09 |
| 2014/0326526 A1* | 11/2014 | Yasui et al. | 180/274 |
| 2014/0361582 A1* | 12/2014 | Franzke et al. | 296/204 |

FOREIGN PATENT DOCUMENTS

| | | |
|---|---|---|
| JP | 2009-061879 A | 3/2009 |
| WO | 2009/072614 A | 6/2009 |

\* cited by examiner

FRONT SUBFRAME STRUCTURE FOR AUTOMOTIVE VEHICLE

TECHNICAL FIELD

The present invention relates to a front subframe structure for an automotive vehicle, which comprises a pair of right and left side members each extending in a front-rear direction of the vehicle and a cross member extending in a vehicle width direction so as to couple the right and left side members together.

BACKGROUND ART

Heretofore, there has been known a vehicle suspension apparatus which comprises: a single piece of pipe member formed in a U shape in top plan view; a coupling member (cross member) coupling together right and left side portions of the U-shaped pipe member; and transfer means composed of two pipe members disposed in an inverted V shape with respect to the U-shaped pipe member, as disclosed in the following Patent Document 1. This vehicle suspension apparatus is configured to transfer an external force input from a suspension arm into a front subframe, to a mounting portion provided on a vehicle body-side member via the transfer means, thereby increasing a suspension arm mounting rigidity and improve a torsional rigidity of the apparatus.

There has also been known a vehicle lower body structure which comprises a front subframe (suspension member) capable of transferring a collision load input from a front end toward a rear end of a vehicle, as disclosed in the following Patent Document 2. This front subframe has a rear portion joined to a pair of right and left floor frames (side members) and a pair of right and left tunnel reinforcements of a vehicle body at four points arranged in a vehicle width direction. Thus, even in a situation where a frontal collision load input from the front end of the vehicle is concentrated on one side in the vehicle width direction, it becomes possible to transfer the frontal collision load to front and rear frameworks of a lower portion of the vehicle body in an adequately distributed manner.

Further, there has been a vehicle front body structure which comprises: a front subframe located beneath a vehicle front-side portion of a vehicle-body frame, wherein a front end thereof extends up to a vicinity of a front end of the vehicle front-side portion of the vehicle-body frame; and a floor panel formed over a periphery on a lower side of a passenger compartment, and provided with a pair of right and left mounting portions each configured to be fastened to a respective one of right and left rear end-side support portions provided close to a rear end of the front subframe, and a stopper portion formed to protrude downwardly with respect to the floor panel at a position rearward of each of the mounting portions, wherein each of the mounting portions and the stopper portion is formed in the vicinity of a front end of the floor panel, as disclosed in the following Patent Document 3. In this vehicle front body structure, the floor panel comprises a floor frame provided to extend in a front-rear direction of the vehicle, and a branch frame provided to branch from a branch site located in a front portion of the floor frame, toward a vehicle inward side and extend rearwardly, wherein each of the floor frame and the branch frame is formed to protrude downwardly along the extending direction. Further, at or in a vicinity of the branch site, each of the mounting portions is formed such that a height position of a lower surface thereof is higher than that of a lower surface of the floor frame in a vicinity of the mounting portion, and, at or in the vicinity of the branch site, the stopper portion is formed in adjacent relation to the floor frame.

The vehicle suspension apparatus disclosed in the Patent Document 1 is configured to transfer an external force such as a lateral force input from the suspension arm into the front subframe during vehicle traveling, to the mounting portion provided on the vehicle body-side high-rigidity member (floor frame), so that it becomes possible to stably support an external force given from the suspension arm to the front subframe, and improve a supporting rigidity for a front arm pivotally supported by the front subframe. However, in this vehicle suspension apparatus, the U-shaped pipe member making up a main body of the front subframe has to be increased in diameter in order to satisfactorily ensure the torsional rigidity and the like, wall thickness and others, and a rear portion of such a U-shaped pipe member is placed beneath a front region of a floor tunnel, which causes a problem that layout flexibility of members to be placed inside the floor tunnel is impaired. Moreover, in this vehicle suspension apparatus, it is difficult to facilitate deformation in a front portion of the U-shaped pipe member during a vehicle collision, so that it is unable to sufficiently bring out a collision load absorbing function based on compressive deformation of the front portion of the U-shaped pipe member.

The vehicle lower body structure disclosed in the Patent Document 2 is configured to receive a collision load input into a power plant in the event of a vehicle frontal collision, by three load-receiving points provided in a collision load transfer member, so that it has an advantage of being able to support the load by the plurality of front and rear frameworks of the lower portion of the vehicle body in a distributed manner, without generating an unexpected turning force in the power plant. However, when this vehicle lower body structure is applied to a vehicle in which a floor tunnel is formed in a bottom of a passenger compartment, a rear portion (rear-side cross beam) of the front subframe is also placed beneath a front end of a floor tunnel, which causes a problem that layout flexibility of members to be installed within the floor tunnel is impaired, and a vehicle body rigidity against an external force, such as a lateral force input from the suspension arm during vehicle traveling, cannot be satisfactorily ensured. In this regard, there remains a need for improvement.

The vehicle front body structure disclosed in the Patent Document 3 is configured such that, when the vehicle undergoes a frontal collision against an obstacle having a height lower than a front end of the vehicle-body frame, a collision load is transferred from the front subframe to the mounting portion and supported by the stopper portion, wherein the collision load is reliably received by the branch site between the floor frame and the branch frame provided to extend in the front-rear direction of the vehicle, or the stopper portion provided in the vicinity of the branch site. That is, this vehicle front body structure is capable of supporting the collision load while distributing it to the branch frame and the floor frame, to thereby prevent a rearward movement of the front subframe.

However, in the vehicle front body structure disclosed in the Patent Document 3, the front subframe comprises: a pair of right and left side members each having, in top plan view, a front portion placed to linearly extend in the front-rear direction of the vehicle, a bent portion located rearward of the front portion and bent inwardly in a vehicle width direction, a rear portion disposed rearward of the bent portion to extend in the front-rear direction, and a cross member placed to couple together rear ends of the right and left side members, wherein the front subframe is formed as a perimeter frame obtained by superimposing and joining an upper panel and a lower panel together, and a base end of a suspension arm (lower arm) is pivotally supported by the bent portion and the rear portion of the front side frame. For this reason, in this vehicle front body structure, the bent portion has to be largely bent inwardly in the vehicle width direction in order to satisfactorily ensure an arm length of the suspension arm to thereby improve suspension geometry. Thus, the front subframe has to be increased in size to satisfactorily ensure rigidity thereof, in order to configure the structure such that both a lateral force input from the suspension arm and a collision load input from a front end of the side member can be stably supported by the bent portion and the rear portion, which leads to negative effects, such as an increase in vehicle body weight, and occurrence of a situation where noise is likely to be generated due to panel vibration caused by an increased surface area of the front subframe.

LIST OF PRIOR ART DOCUMENTS

Patent Documents

Patent Document 1: JP 2009-61879A
Patent Document 2: WO 2009/072614A
Patent Document 3: JP 2005-271811A

SUMMARY OF THE INVENTION

The present invention has been made in view of the above problems, and an object thereof is to provide a front subframe structure for an automotive vehicle, which is capable of stably supporting an external force such as a lateral force input from a suspension arm, with a simple and compact configuration, and satisfactorily ensuring a vehicle body rigidity against a collision load input in the event of a vehicle collision.

Therefore, the present invention provides a front subframe structure for an automotive vehicle, which comprises: a pair of right and left side members each provided with an arm support member for supporting at least a front portion of a suspension arm; a cross member disposed between the left and right side members to extend approximately linearly in a vehicle width direction so as to couple together respective locations in the side members at each of which the arm support member is provided; and an oblique member extending from a vehicle width directional central portion of the cross member, in each of right and left directions of the vehicle and obliquely rearwardly and outwardly in the vehicle width direction, wherein each of the side members has a rear end joined to a rear portion of a respective one of the oblique members, and wherein the rear portion of the oblique member is provided with a tunnel-lower-frame coupling portion configured to be coupled to a tunnel lower frame provided along a lower edge of a floor tunnel formed by causing a vehicle width directional intermediate region of a floor panel to bulge upwardly, and a floor frame attaching portion configured to be attached to a floor frame extending in a front-rear direction of the vehicle along the floor panel.

DESCRIPTION OF EMBODIMENTS

FIGS. 1 to 6 illustrate a front subframe structure for an automotive vehicle, according to one embodiment of the present invention. The automotive vehicle comprises: a dash panel 1 placed at a front end of a passenger compartment; and a pair of right and left front side frames 2 each extending from a lower end of the dash panel 1, forwardly, i.e., toward a front end of the vehicle. A front subframe 3 is disposed below the front side frames 2 to support a lower arm (suspension arm) 4 and others of a front suspension apparatus.

Each of the front side frames 2 comprises, in side view, a horizontal portion 2a extending approximately horizontally along a front-rear direction of the vehicle, and an inclined portion 2b extending from a rear end of the horizontal portion 2a, rearwardly, i.e., toward a rear end of the vehicle, and obliquely downwardly, wherein an aftermentioned floor frame 31 is provided to connect to a rear end of the inclined portion 2b. Further, a non-illustrated crash can composed, for example, of a metal, tubular-shaped body, is provided at a front end of the front side frame 2 to protruded forward of the vehicle, and an non-illustrated bumper reinforcement is attached to a front end of the crash can to extend in a vehicle width direction.

The front subframe 3 comprises: a pair of right and left side members 5 each extending in the front-rear direction of the vehicle, in a position beneath a respective one of the front side frames 2; a front cross member 6 provided to extend in the vehicle width direction so as to couple front ends of the right and left side members 5 together; a central cross member 7 provided to extend approximately linearly in the vehicle width direction so as to couple together front-rear directional intermediate portions of the right and left side members 5; a pair of right and left oblique members 8 each extending from a vehicle width directional central portion of the central cross member 7, in a respective one of right and left directions of the vehicle and obliquely rearwardly and outwardly in the vehicle width direction, in top plan view; and a rear cross member 9 provided to extend in the vehicle width direction so as to couple rear ends of the right and left oblique members together.

Figure 3:
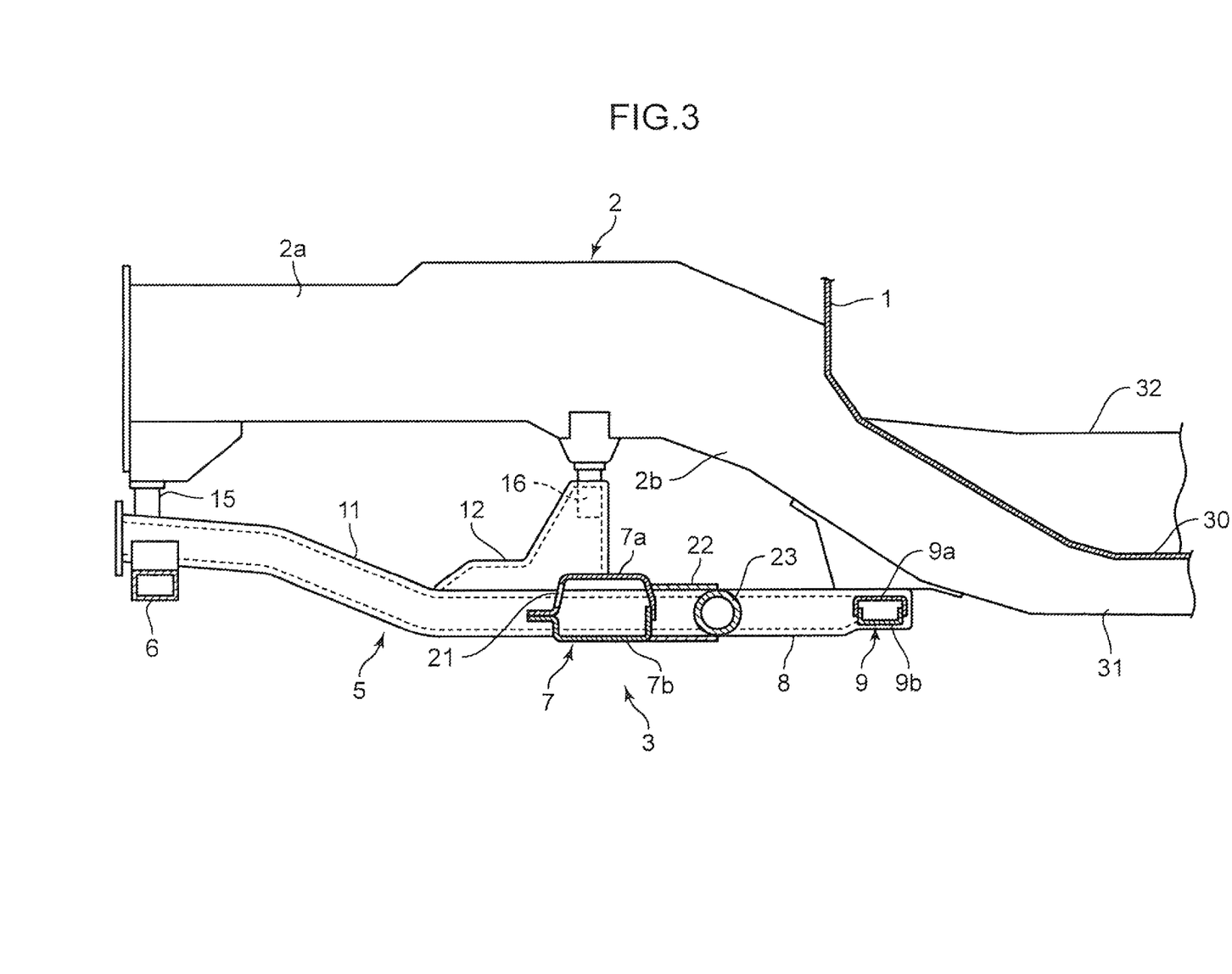
FIG. 3 is a side sectional view illustrating a specific configuration of the front subframe structure.
Figure 4:
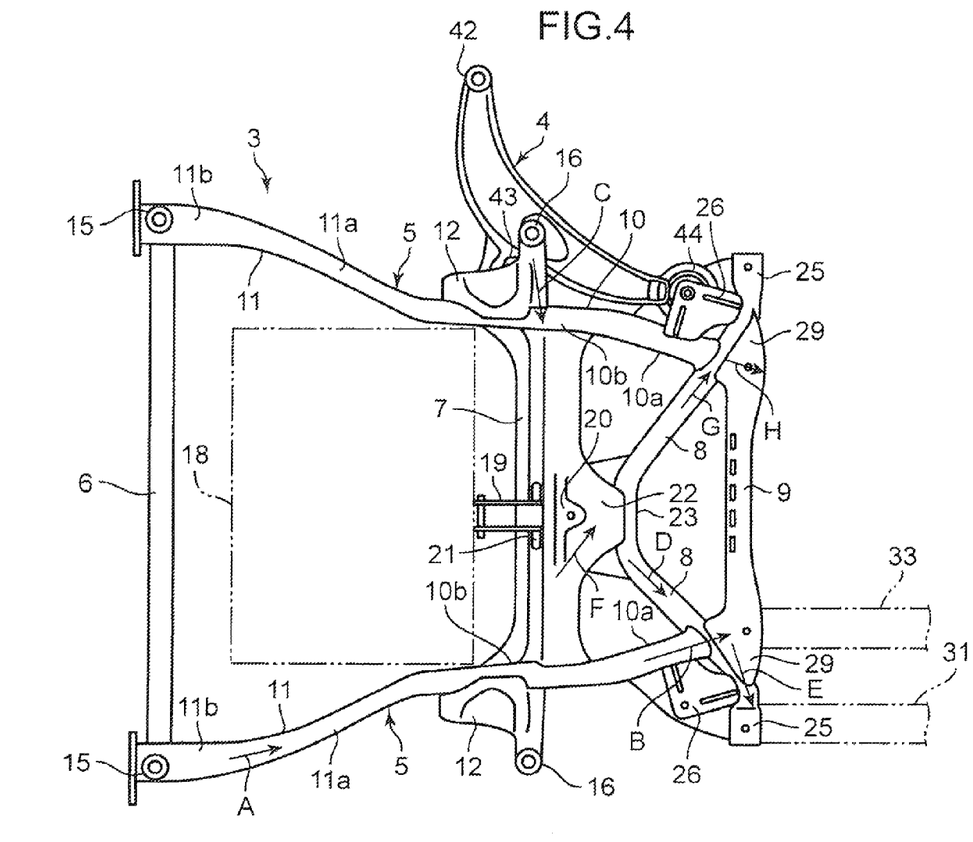
FIG. 4 is a top plan view illustrating the specific configuration of the front subframe structure.
Figure 5:
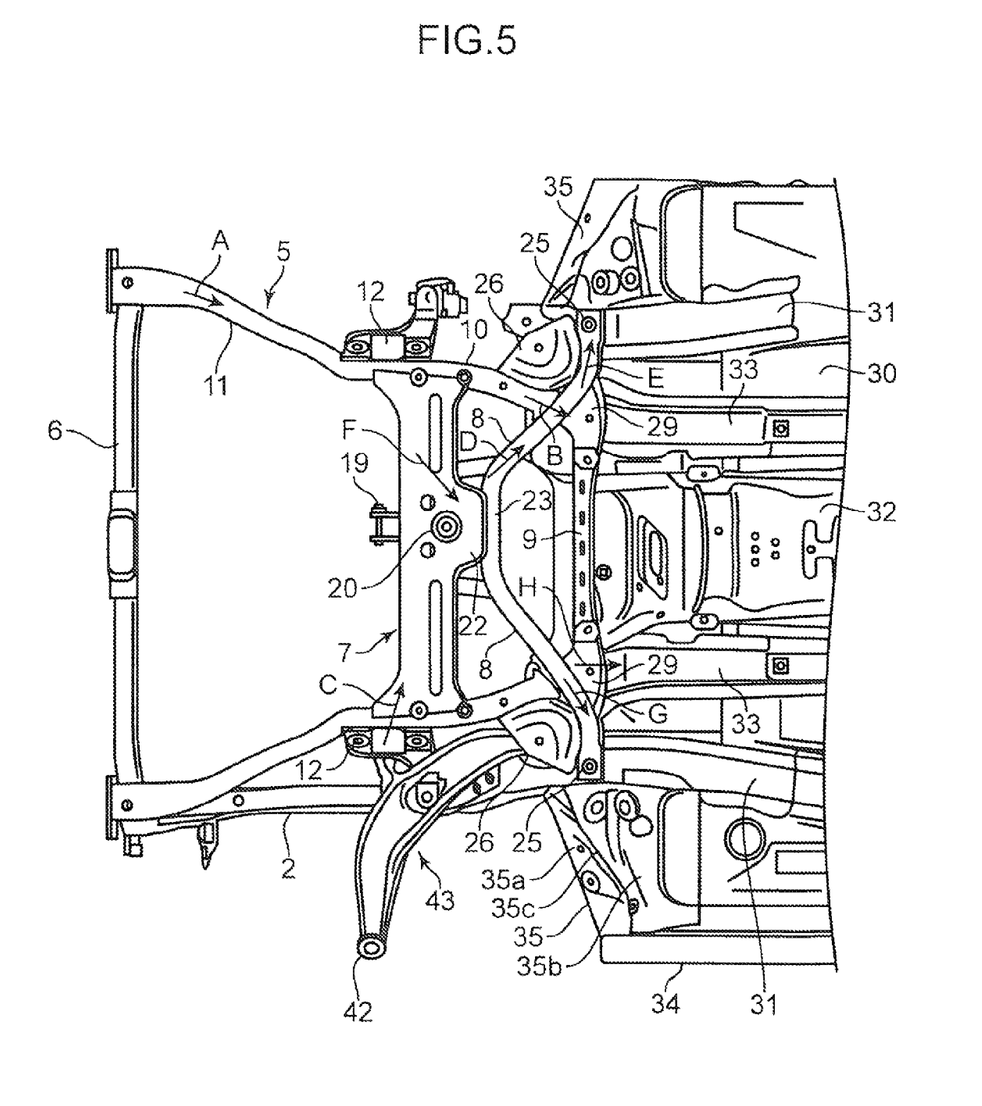
FIG. 5 is a bottom view illustrating the specific configuration of the front subframe structure.
Figure 6:
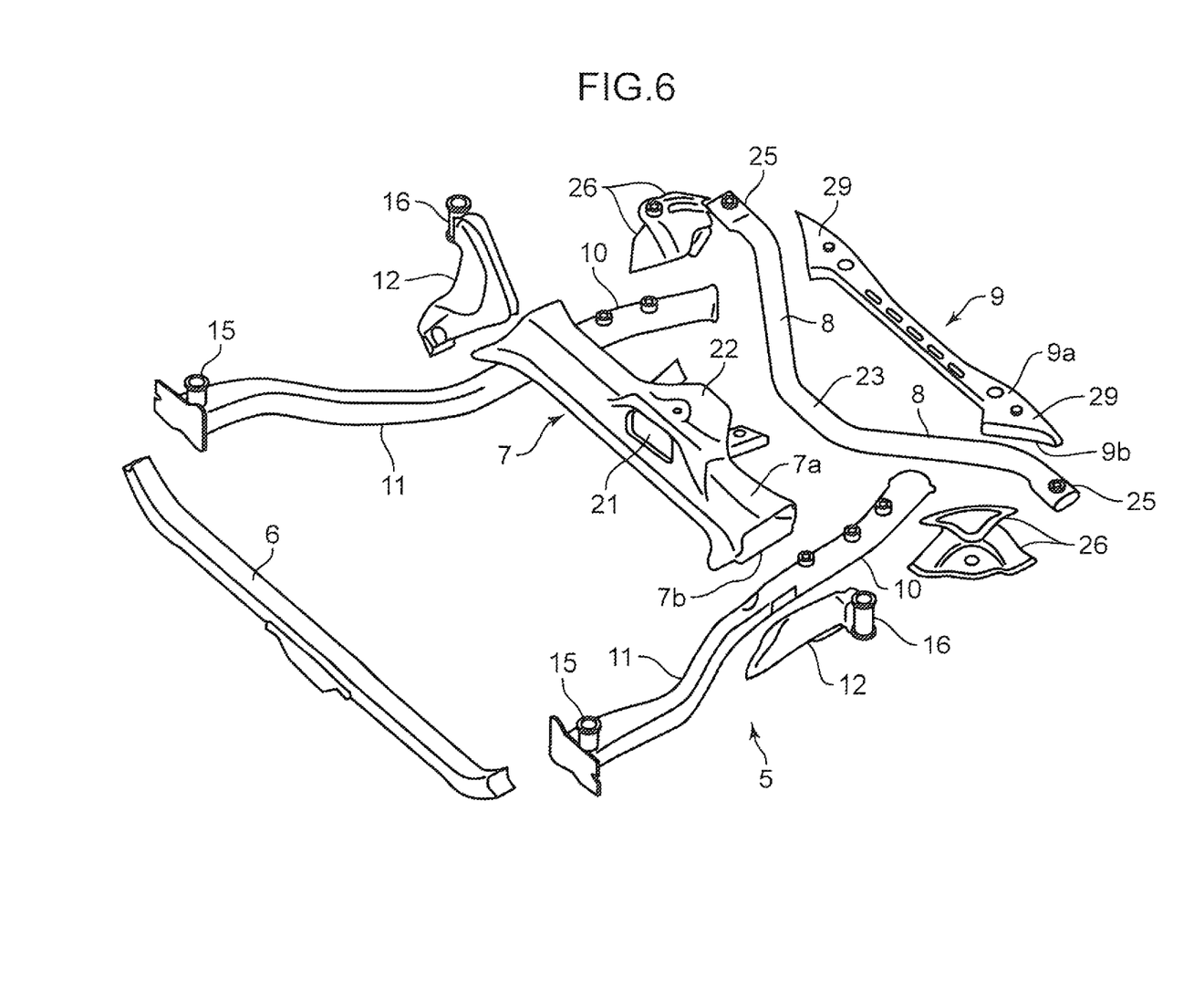
FIG. 6 is an exploded perspective view illustrating the specific configuration of the front subframe structure.

As illustrated in FIGS. 4 and 5, each of the side members 5 has: a rear portion 10 extending from a location of an aftermentioned front-side arm support member 12 toward the rear end of the vehicle (hereinafter referred to simply as "side-member rear portion"); and a front portion 11 provided to connect to a front end of the side-member rear portion 10 (hereinafter referred to simply as "side-member front portion"). The side-member rear portion 10 is placed approximately horizontally, and the side-member front portion 11 is placed in a forwardly and obliquely upwardly extending state, in side view (see FIG. 3).

The side-member rear portion 10 is composed of a round pipe-shaped member with a given diameter, and has, in top plan view, a rear region 10a extending toward the rear end of the vehicle and obliquely inwardly in the vehicle width direction, a front region 10b placed to extend from a front end of the rear region 10a toward the front end of the vehicle and approximately linearly, as illustrated in FIG. 4. A front-side arm support member 12 for supporting an aftermentioned front-side coupling portion 43 provided at a base end of the lower arm (suspension arm) 4 is attached to a vehicle width directional outer surface of the front region 10b. Further, an aftermentioned tunnel-lower-frame coupling portion 29 is disposed on a rearward extension line of the rear region 10a.

The side-member front portion 11 has a rear region 11a and a front region 11b. In top plan view, the rear region 11a extends from the front end of the side-member rear portion 10 toward the front end of the vehicle and obliquely outwardly in the vehicle width direction, and the front region 11b is provided to extend from a front end of the rear region 11a toward the front end of the vehicle and approximately linearly. Each of the rear region 11a and the front region 11b of the side-member front portion 11 is formed in a square pipe shape by subjecting a round pipe-shaped member with a given diameter provided in integral relation with the side-member rear portion 10, to a hydroforming process. Further, the front region 11b of the side-member front portion 11 is formed to have a diameter greater than that of the rear region 11a, wherein a lateral end of the front cross member 6 is joined to vehicle width directional inner and lower surfaces of the front region 11b, and a first coupling member 15 is standingly provided on an upper surface of the front region 11b in such a manner as to be fastenable to a front portion of the front side frame 2 by using a fastening bolt.

A bracket member serving as the front-side arm support member 12 is attached to the vehicle width directional outer surface of the side-member rear portion 10 in a region (front region 10b) to which the central cross member 7 is coupled, in a posture where it protrudes outwardly from the side member 5. Further, a second coupling member 16 is integrally provided on top of the bracket member in such a manner as be couplable to the front side frame 2. The second coupling member 16 is configured to be fastened to a lower surface of a front-rear directional intermediate portion of the front side frame 2 by using a fastening bolt.

In the case where the side-member front portion 11 is subjected to a hydroforming process as mentioned above, due to resulting work hardening, strength of the side-member front portion 11 is apt to become greater than that of the side-member rear portion 10. However, in the side-member rear portion 10, the front region 10b is reinforced by coupling a lateral end of the central cross member 7 thereto and attaching the front-side arm support member 12 thereto, and the rear region 10a is reinforced by connecting a rear end of the side-member rear portion 10 to a corresponding one of the oblique members 8, and bridgingly attaching an aftermentioned rear-side arm support member 26 between the side-member rear portion 10 and the oblique member 8. Thus, the strength (specifically, axial proof strength) of the side-member rear portion 10 becomes greater than that of the side-member front portion 11, so that, during a vehicle collision, it becomes possible to suppress deformation of the side-member rear portion 10 due to a collision load input from the front end of the side member 5, and promote compressive deformation of the side-member front portion 11. As a result, the side-member front portion 11 can function as a collision load absorbing section.

As illustrated in FIG. 3, the central cross member 7 is formed in a closed cross-section shape having a given width and extending approximately linearly in the vehicle width direction, by using an upper panel 7a and a lower panel 7b each made, for example, of steel sheet. Then, right and left opposite lateral ends of the central cross member 7 are welded, respectively, to the vehicle width directional inner surfaces of the front regions 10b of the side-member rear portions 10 of the right and left side members 5. Thus, respective locations (front regions 10b) in the vehicle width directional outer surfaces of the right and left side members 5 at each of which the front-side arm support member 12 is attached (locations of the front-side arm support members 12) are coupled together by the central cross member 7. Further, the central cross member 7 has an opening 21 formed in a front wall thereof to introduce a rear mount 19 provided on a central region of a rear surface of a power plant 18 (see FIG. 4) comprised, for example, of an automotive engine, to a power plant mounting portion 20 provided in the vehicle width directional central portion of the central cross member 7.

The vehicle width directional central portion of the central cross member 7 is provided with a pair of upper and lower oblique-member mounting portions 22 each protruding from a rear surface of the central cross member 7 toward the rear end of the vehicle. Then, front ends of the right and left oblique members 8 are attached to upper and lower oblique-member mounting portions 22, so that the right and left oblique members 8 and the central cross member 7 are integrally joined together, and the right and left oblique members 8 are disposed to protrude from the vehicle width directional central portion of the central cross member 7 toward the rear end of the vehicle to form a truncated chevron shape in a plan view. More specifically, as a result of bending a round pipe member, the right and left oblique members 8 and a connection portion 23 connecting the front ends thereof are integrally formed. Then, the right and left oblique members 8 and the central cross member 7 are integrally joined together by welding the connection portion 23 to the upper and lower oblique-member mounting portions 22 while clamping the connection portion 23 between the oblique-member mounting portions 22.

A floor frame attaching portion 25 is formed at the rear end of each of the oblique members 8, for example, by bending the rear end of the oblique member 8 to allow the rear end to extend outwardly in the vehicle width direction, and then crushing the rear end into a flat shape. The rear end of the side-member rear portion 10 is welded to a front surface of a rear portion of the oblique member 8, so that the oblique member 8 and the side member 5 are integrally coupled together. Further, each of right and left opposite lateral ends of the rear cross member 9 is welded to a rear surface of the rear portion of a respective one of the right and left oblique members 8, so that the rear portions of the right and left oblique members 8 are coupled together through the rear cross member 9.

A rear-side arm support member 26 composed of a pair of upper and lower plate members is bridgingly disposed between the side-member rear portion 10, and the floor frame attaching portion 25 formed at the rear end of the oblique member 8. Then, an aftermentioned rear-side coupling portion 44 provided at the base end of the lower arm 4 is supported by the rear-side arm support member 26.

The rear cross member 9 is formed in a closed cross-section shape having a given width and extending in the vehicle width direction, by using an upper panel 9a and a lower panel 9b each made, for example, of steel sheet. The rear cross member 9 has a tunnel-lower-frame coupling portion 29 formed to have a front-rear directional width greater than that of a vehicle width directional central portion of the rear cross member 9, and provided at each of the right and left opposite lateral ends thereof. A front-rear directional dimension of the rear cross member 9 is set to be less than that of the central cross member 7 (see FIG. 4), and an up-down directional dimension of the rear cross member 9 is set to be less than that of the oblique member 8 (see FIG. 3).

As illustrated in FIG. 5, in a floor panel 30 making up a bottom of the passenger compartment, a floor tunnel 32 is formed in a vehicle width directional central region of a lower surface thereof to bulge toward an inside of the passenger compartment (upwardly) and located to extend in the front-rear direction of the vehicle, and a pair of right and left tunnel lower frames 33 are provided on the lower surface thereof and each placed to extend in the front-rear direction of the vehicle along a respective one of opposed lower edges of the floor tunnel 32. Further, a floor frame 31 is provided on the lower surface of the floor panel 30 at a position outward of each of the tunnel lower frames 33 in the vehicle width direction and placed in continuous relation to a rear end of each of the front side frames 2 to extend toward the rear end of the vehicle.

The floor frame attaching portion 25 provided at the rear end of each of the oblique members 8 is fastened to a front end of a respective one of the floor frames 31 through a fastening bolt, and the tunnel-lower-frame coupling portion 29 provided at each of the lateral ends of the rear cross member 9 is fastened to a front end of the tunnel lower frame 33 through a fastening bolt. In this way, a rear portion of each of the side members 5 is fixed to a vehicle-body frame at a respective one of right and left two positions via the floor frame attaching portion 25 and the tunnel-lower-frame coupling portion 29.

As a result of fixing the floor frame attaching portion 25 and the tunnel-lower-frame coupling portion 29 provided at the rear portion of the oblique member 8, to the respective front ends of the floor frame 31 and the tunnel lower frame 33, in the above manner, the floor frame 31 and the tunnel lower frame 33 are coupled together through the floor frame attaching portion 25 and the tunnel-lower-frame coupling portion 29, and further the frame attaching portion 25, the tunnel-lower-frame coupling portion 29 and the floor panel 30 are arranged to define thereamong an opening 47 corresponding to up-down directional dimensions of the floor frame 31 and the tunnel lower frame 33.

Figure 1:
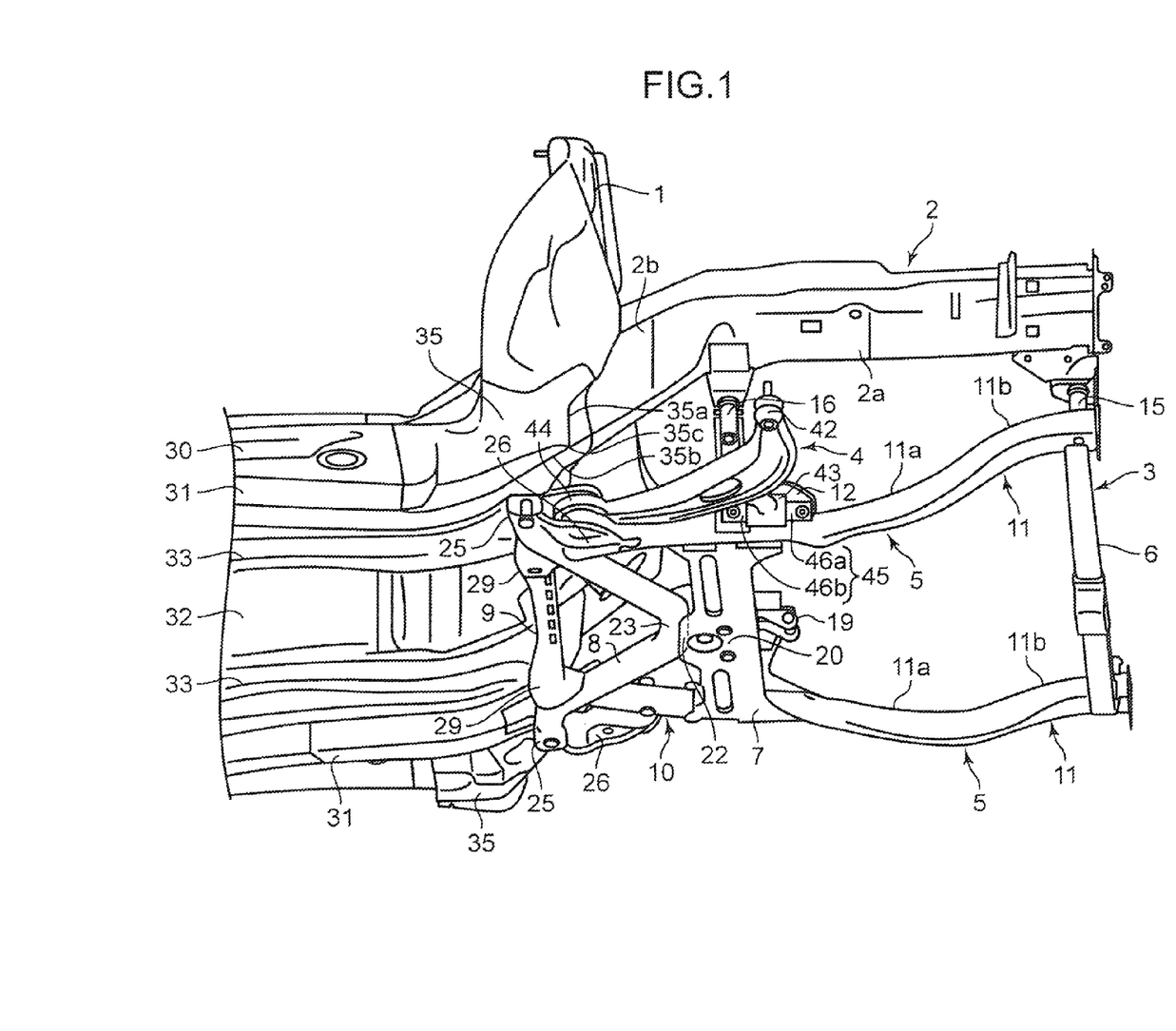
FIG. 1 is a perspective view illustrating a front subframe structure for an automotive vehicle, according to one embodiment of the present invention.

A side sill 34 is placed on each of right and left sides of the floor panel 30 to extend in the front-rear direction along a lateral edge of the floor panel 30, and a torque box 35 is placed to couple a front portion of the side sill 34 and a front portion of the floor frame 31 (FIGS. 1 and 5). The torque box 35 has a vertical wall composed of a front plate 35a extending in the vehicle width direction along a lower portion of the dash panel 1 provided at the front end of the passenger compartment, and a bottom plate 35b extending from a lower end of the front plate 35a, wherein the torque box 35 is formed such that a ridge line 35c between the front plate 35a toward the rear end of the vehicle and the bottom plate 35b extends from a position adjacent to the floor frame attaching portion 25, outwardly in the vehicle width direction.

As illustrated in FIGS. 1, 4 and others, the lower arm 4 is a so-called A-arm in which a distal end thereof is coupled to a non-illustrated wheel support member (axle housing) via a ball joint 42, and a vehicle width directional inner portion (base end) thereof is provided with a pair of front-side and rear-side coupling portions 43, 44. The front-side coupling portion 43 and the rear-side coupling portion 44 of the lower arm 4 are supported with respect to respective ones of the front-side arm support member 12 and the rear-side arm support member 26 each provided on the front subframe 3, in a swingable and elastically deformable manner.

The front-side coupling portion 43 of the lower arm 4 is provided with a support shaft 45 extending in the front-rear direction of the vehicle, and a rubber bush (illustration is omitted) embracing the support shaft. When front and rear opposite ends 46a, 46b of the support shaft 45 is attached to the front-side arm support member 12 provided on the side-member rear portion 10, the front-side coupling portion 43 is supported rotationally movably about the support shaft serving as a supporting point, and supported elastically deformably according to an elastic force of the rubber bush. The rear end 45b of the support shaft is attached to the rear region 10a of the side-member rear portion 10 at a position corresponding to a site to which the central cross member 7 is coupled.

The rear-side coupling portion 44 of the lower arm 4 is provided with a support shaft (illustration is omitted) extending in an up-down direction, and a rubber bush (illustration is omitted) embracing the support shaft. When upper and lower opposite ends of the support shaft is attached to the rear-side arm support member 26 bridgingly disposed between the side-member rear portion 10 and the floor frame attaching portion 25 of the oblique member 8, the rear-side coupling portion 44 is supported rotationally movably about the support shaft serving as a supporting point, and supported elastically deformably according to an elastic force of the rubber bush.

The front subframe 3 is carried in an automotive vehicle assembling line in a state in which the front suspension apparatus comprising the lower arm 4, etc., are sub-assembled, and introduced into an engine compartment of the vehicle from below the front side frame 2. Then, when upper ends of the first and second coupling members 15, 16 provided on the side member 5 are coupled to a lower surface of the front side frame 2, the front end and the front-rear directional intermediate portion of the side member 5 are attached to the front side frame 2.

Further, the power plant 18 composed of an automotive engine and others is placed between the right and left front side frames 2, and the rear mount 19 of the power plant 18 is introduced to the power plant mounting portion 20 through the opening 21 formed in the front wall of the central cross member 7 and attached to the power plant mounting portion 20. In this manner, a rear end of the power plant 18 is supported by the front subframe 3.

As mentioned above, the front subframe structure according to the above embodiment comprises: the pair of right and left side members 5 each provided with the front arm support member 12 for supporting at least the front-side coupling portion 43 of the lower arm 4 (suspension arm); the central cross member 7 disposed between the left and right side members 5 to extend approximately linearly in the vehicle width direction so as to couple together respective locations in the side members 5 at each of which the front arm support member 12 is provided; and the oblique members 8 each extending from the vehicle width directional central portion of the central cross member 7, in a respective one of the right and left directions of the vehicle and obliquely rearwardly and outwardly in the vehicle width direction, wherein each of the rear portion of the side members 5 is joined to a respective one of the oblique members 8, and wherein the oblique member 8 is provided with the tunnel-lower-frame coupling portion 33 configured to be coupled to the tunnel lower frame 33 provided along the lower edge of the floor tunnel 32, and the floor frame attaching portion 25 configured to be coupled to the floor frame 31 extending in the front-rear direction of the vehicle along the floor panel 30. Thus, this front subframe structure has an advantage of being able to stably support an external force such as a lateral force input from the suspension arm 4, with a simple and compact configuration, and satisfactorily ensuring a vehicle body rigidity against a collision load input in the event of a vehicle collision.

More specifically, in the above front subframe structure, the rear end of each of the side members 5 constituting the front subframe 3 is joined to a corresponding one of the pair of right and left oblique members 8 each extending from the vehicle width directional central portion of the central cross member 7, obliquely rearwardly and outwardly in the vehicle width direction, and wherein the floor frame attaching portion 25 provided in the rear portion of each of the oblique members 8 is attached to the floor frame 31 placed to extend in the front-rear direction of the vehicle along the lower surface of the floor panel, and the tunnel-lower-frame coupling portion 29 which is provided in the rear end of each of the oblique members 8, particularly, provided at each of the lateral ends of the rear cross member 9 connected to a respective one of the rear portions of the oblique members 8, is fastened to the lower surface of the front portion of the tunnel lower frame 33 by a bolt. That is, the rear end of each of the side members 5 provided on right and left sides of the front side frame 3 is stably fixed to a vehicle-body frame at a respective one of right and left two positions.

Thus, it becomes possible to, during vehicle traveling, transfer an external force, such as a lateral force input from the lower arm 4 located on one side (right side) of the vehicle body into the front-side arm support member 12 provided on a right one of the right side members 5, for example, as indicated by the arrow C in FIGS. 4 and 5, from the central cross member 7 to the other (left) side member 5, as indicated by the arrow D, and then from the other side member 5 to the floor frame 31, the tunnel lower frame 33 and others located rearward of the other side member 5, so as to support the external force. Therefore, the above front subframe structure makes it possible to effectively suppress deformation of the vehicle body with a simple structure, without causing an increase in size of the front subframe 3, and improve vehicle traveling stability.

In addition, for example, as indicated by the arrow A in FIGS. 4 and 5, in the case where, in the event of a vehicle collision, a collision load is input into a side-member front portion 11 located on a left side of the vehicle body, it becomes possible to transfer the collision load from the floor frame attaching portion 25 and the tunnel-lower-frame coupling portion 29 provided in the rear portion of the oblique member 8 located on the left side of the vehicle, to respective ones of the floor frame 31 and the tunnel lower frame 33, in a distributed manner, as indicated by the arrows B and E, so as to support the collision load. Further, it becomes possible to transfer the collision load from the central cross member 7 and the right oblique member 8 to the floor frame 31 and the tunnel lower frame 33 located on a right side of the vehicle body, via the floor frame attaching portion 25 and the tunnel-lower-frame coupling portion 29, in a distributed manner, as indicated by the arrows F, G and H, so as to support the collision load. Therefore, the above front subframe structure makes it possible to apply the collision load to the side-member front portion 11 in a concentrated manner while effectively suppressing the occurrence of an undesirable situation, such as a situation where the side-member rear portion 10 falls down inwardly according to the collision load, to cause the side-member front portion 11 to undergo compressive deformation in an accordion-folded manner, thereby effectively absorbing a collision load input in the event of a vehicle collision.

In the front subframe structure according to the above embodiment, the side-member rear portion 10 is reinforced by: coupling the lateral end of the central cross member 7 to the vehicle width directional inner surface of the front region 10b of the side-member rear portion 10; attaching the front-side arm support member 12 to the vehicle width directional outer surface of the front region 10b; and providing the rear-side arm support member 26 in a joined region between the oblique member 8 and the rear end of the side-member rear portion 10, so that the strength (axial proof strength) of the side-member rear portion 10 is set to become greater than that of the side-member front portion 11. Thus, in the case where a collision load is input into the front end of the side member 5 in the event of a vehicle collision, it becomes possible to concentrate the collision load on the side-member front portion 11 while effectively suppressing deformation of the side-member rear portion 10, to positively produce deformation in the side-member front portion 11, thereby effectively bringing out a function of absorbing the collision load. Therefore, the above front subframe structure makes it possible to apply a collision load input in the side member 5 in the event of a vehicle collision, to the side-member front portion 11 in a concentrated manner, while effectively suppressing a situation where the side-member rear portion 10 largely deforms and falls down inwardly according to the collision load, or a situation where the rear end of the side member 5 is separated from the vehicle-body frame according to the collision load, to cause the side-member front portion 11 to undergo deformation, thereby effectively absorbing the collision load to reliably prevent an influence of the collision load from being exerted on the side-member rear portion 10 and an inside of the passenger compartment.

In the front subframe structure according to the above embodiment, the rear-side arm support member 26 for supporting the rear-side coupling portion 44 of the lower arm 4 (suspension arm) is bridgingly disposed between the side-member rear portion 10 and the floor frame attaching portion 25 provided in the oblique member 8. That is, the side-member rear portion 10 is effectively reinforced with a simpler configuration by utilizing the rear-side arm support member 26, without providing any separate reinforcement member for reinforcing the side-member rear portion 10. Thus, the above front subframe structure has an advantage of being able to easily and satisfactorily ensure a vehicle body rigidity against a collision load in the event of a vehicle collision and an external force such as a lateral force during vehicle traveling, each input in the side-member rear portion 10 and the oblique member 8, thereby effectively suppressing an undesirable situation, such as a situation where the side-member rear portion 10 falls down inwardly according to the collision load, and further suppress deformation of the front subframe 3 due to an external force such as a lateral force input from the lower arm 4 during vehicle traveling, thereby effectively improve vehicle traveling stability.

In the front subframe structure according to the above embodiment, the rear cross member 9 is provided to extend in the vehicle width direction so as to couple the respective rear portions of the right and left oblique members 8, wherein the rear cross member 9 has an up-down directional dimension less than that of each of the oblique members 8, as illustrated in FIG. 3, so that it becomes possible to effectively suppressing expansive/compressive deformation of the floor tunnel 32 according to an external force such as a lateral force input from the oblique member 8 of the front subframe 5 into the tunnel lower frame 33 during vehicle traveling, while suppressing an disadvantage caused, for example, by a situation where a thick rear cross member is provided beneath a front portion of the floor tunnel 32, i.e., a disadvantage of impairing flexibility in layout of a member such as propeller shaft or an exhaust pipe placed inside the floor tunnel 32. Thus, the above front subframe structure has an advantage of being able to effectively improve a vehicle body rigidity against a collision load in the event of a vehicle collision and an external force such as a lateral force during vehicle traveling, each input from the oblique member 8 into the tunnel lower frame 33, with a simple and lightweight structure.

In the front subframe structure according to the above embodiment, the torque box 35 is provided in a lateral region of a lower portion of the dash panel 1 to couple together the front portion of the side sill 34 placed along each of the right and left lateral edges of the passenger compartment, and the front portion of the floor frame 31, wherein the torque box 35 has the vertical wall composed of the front plate 35a extending from a position adjacent to the floor frame attaching portion 25, outwardly in the vehicle width direction, and the ridge line 35c extending outwardly in the vehicle width direction. Thus, it becomes possible to transfer a collision load in the event of a vehicle collision and an external force such as a lateral force during vehicle traveling, each input from the oblique member 8 into the floor frame 31, to the side sill 34 via the front plate 35a and the ridge line 35c constituting a rigid portion of the torque box 35, in an efficiently distributed manner, so as to support the collision load and the external force. Thus, the above front subframe structure makes it possible to further effectively improve the vehicle body rigidity against the collision load and the external force such as a lateral force.

In place of the above embodiment in which each of the side members 5 and the oblique members 8 of the front subframe 3 is formed using a pipe-shaped member, the subframe may be formed as a perimeter frame obtained by superimposing and joining an upper panel and a lower panel together, as in the vehicle front body structure disclosed in the Patent Document 3. However, in the case of using a front subframe composed of the perimeter frame, rigidity has to be ensured, for example, by increasing a surface area thereof, which causes problems, such as an increase in vehicle body weight, and occurrence of a situation where noise is likely to be generated due to panel vibration during vehicle traveling.

In contrast, in the above embodiment, each of the side members 5 and the oblique members 8 constituting the front subframe 3 is formed using a lightweight and high-rigidity pipe-shaped member. In this case, it becomes possible to satisfactorily support both a collision load input into the side member 5 in the event of a vehicle collision, and an external force such as a lateral force input from the lower arm 4 during vehicle traveling, without causing an increase in size of the front subframe 3. Thus, in order to suppress panel vibration due to an increase in surface area of the front subframe 3 to thereby effectively suppress the occurrence of noise, while suppressing an increase in vehicle body weight, it is desirable to form each of the side members 5 and the oblique members 8 by using a pipe-shaped member.

Figure 2:
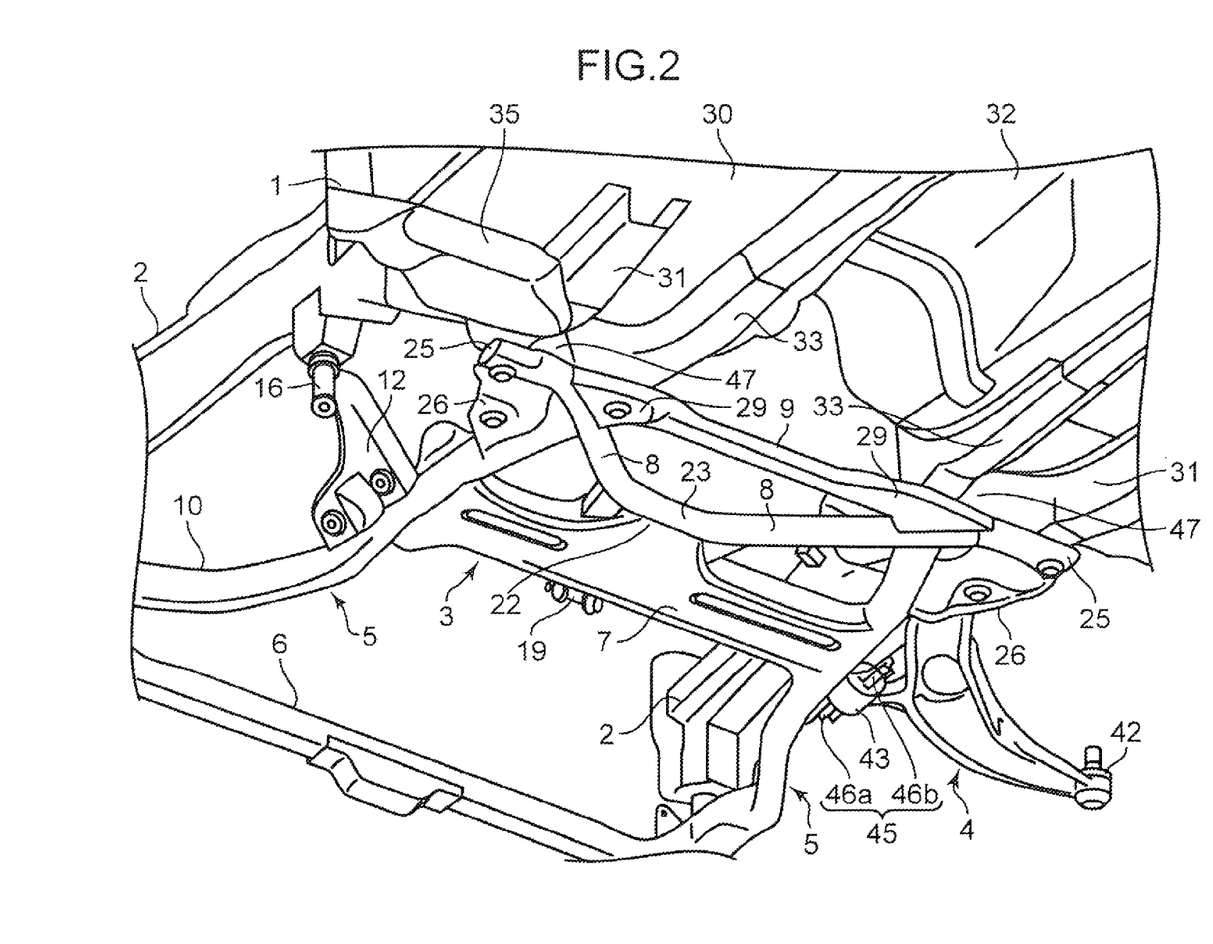
FIG. 2 is a perspective view illustrating the front subframe structure, when viewed obliquely upwardly from a position rearward and downward thereof.

In the front subframe structure according to the above embodiment, as illustrated in FIG. 2, the front end of the floor frame 31 and the front end of the tunnel lower frame 33 are coupled together through the floor frame attaching portion 25 and the tunnel-lower-frame coupling portion 29 provided in the rear portion of the oblique member 8, wherein the frame attaching portion 25, the tunnel-lower-frame coupling portion 29 and the floor panel 30 are arranged to define therea-mong the opening 47 corresponding to up-down directional dimensions of the floor frame 31 and the tunnel lower frame 33. Thus, it becomes possible to allow a harness wired along between the floor frame 31 and the tunnel lower frame 33 to be easily led into the engine compartment through the opening 47.

Therefore, in the above front subframe structure, the front end of the floor frame 31 and the front end of the tunnel lower frame 33 can be coupled together through the floor frame attaching portion 25 and the tunnel-lower-frame coupling portion 29, to thereby sufficiently reinforce the floor frame 31 and the tunnel lower frame 33, without involving a harmful effect that is caused, for example, by providing a branch frame which couples the front end of the floor frame 31 and the front end of the tunnel lower frame 33 together (see the Patent Document 3), i.e., a harmful effect in which the branch frame becomes an obstacle when a harness wired along between the floor frame 31 and the tunnel lower frame 33 is lead into the engine compartment. This makes it possible to transfer a collision load in the event of a vehicle collision and an external force such as a lateral force during vehicle traveling, each input into the oblique member 8, to the floor frame 31 and the tunnel lower frame 33 via the floor frame attaching portion 25 and the tunnel-lower-frame coupling portion 29, to thereby effectively support the collision load and the external force.

The front subframe structure according to the above embodiment is configured such that the side-member front portion 11 is placed to extend toward the front end of the vehicle and obliquely outwardly in the vehicle width direction in a plan view, to thereby ensure a sufficient length of the side-member front portion 11 so as to allow the entire side-member front portion 11 to serve as a collision load absorbing section. Further, this front subframe structure is configured such that the lateral end of the central cross member 7 is coupled to the vehicle width directional inner surface of the front region 10b of the side-member rear portion 10 disposed rearward of the side-member front portion 11 to extend obliquely inwardly in the vehicle width direction, and the front-side arm support member 12 is provided on the vehicle width directional outer surface of the front region 10b. Thus, this front subframe structure allows the front-side arm support member 12 to be located relatively inwardly in the vehicle width direction to ensure a sufficient arm length (vehicle width directional dimension) of the lower arm 4 (suspension arm), thereby effectively improve suspension geometry.

In addition, the front region 10b of the side-member rear portion 10 is located on a vehicle width directional inward side, and the front-side arm support member 12 is attached to the vehicle width directional outer surface of the front region 10b in such a manner as to protrude outwardly from the side member 5, so that it becomes possible to facilitate an operation of attaching the lower arm 4 to the front-side arm support member 12, or the like. Further, it becomes possible to effectively reinforce the side-member rear portion 10 by the front-side arm support member 12, to improve its rigidity. Therefore, the front subframe structure has an advantage of being able to, during a vehicle collision, apply a collision load to the side-member front portion 11 in a concentrated manner with a simple and lightweight structure, thereby allowing the side-member front portion 11 to efficiently function as a collision load absorbing section.

Meanwhile, for example, as described in the Patent Document 3, with a view to satisfactorily ensure an arm length of a suspension arm composed of a lower arm, it is conceivable that an opening having a given size for allowing a front-side coupling portion of the lower arm to be introduced therethrough is formed in a lateral wall of a front-rear directional central portion (bent portion) of a front subframe composed of a perimeter frame, and the front-side coupling portion of the lower arm is introduced into a side member of the front subframe through the opening so as to be supported. In this case, an operation of introducing the front-side coupling portion of the lower arm into the side member of the front subframe through the opening so as to support the front-side coupling portion is cumbersome and complicated. Moreover, due to the formation of the opening in the side member, rigidity of the side member is lowered, so that it is necessary to take a measure to reinforce the side member, for example, by providing a reinforcement plate to a support portion of the lower arm, which leads to negative effects, such as structural complication, and an increase in vehicle body weight.

In contract, the front subframe structure according to the above embodiment, i.e., a structure where the front region 10b of the side-member rear portion 10 is located on a vehicle width directional inward side, and the front-side arm support member 12 is attached to the vehicle width directional outer surface of the front region 10b in such a manner as to protrude outwardly from the side member 5, has an advantage of being able to facilitate the operation of attaching the lower arm 4 to the front-side arm support member 12, or the like, without causing the above negative effects, and satisfactorily ensure rigidity of the side-member rear portion 10 with a simple configuration. In addition, the front region 10b of the side-member rear portion 10 is located on a vehicle width directional inward side, and the power plant 18 is disposed inside the front region 10b. This also provides an advantage of being able to effectively restrict, by the power plant 18, a situation where the front region 10b of the side-member rear portion 10 is deformed so as to fall down inwardly, according to a collision load input in the event of a vehicle collision.

Although the above embodiment has been described based on an example in which the side-member rear portion 10 and the side-member front portion 11 are formed using a single piece of pipe-shaped member, the side member 5 may be formed, for example, by preparing the side-member rear portion 10 and the side-member front portion 11 as separate components, and then integrally combining them into a single piece, for example, by means of welding. In this case, the side-member front portion 11 may be made of a material having an axial proof strength less than that of the side-member rear portion 10, or a thickness of the side-member front portion 11 may be set to a value smaller than that of the side-member rear portion 10. This makes it possible to allow the front portion of the side member 5 to be deformed during a vehicle collision to effectively absorb a collision load.

Figure 7:
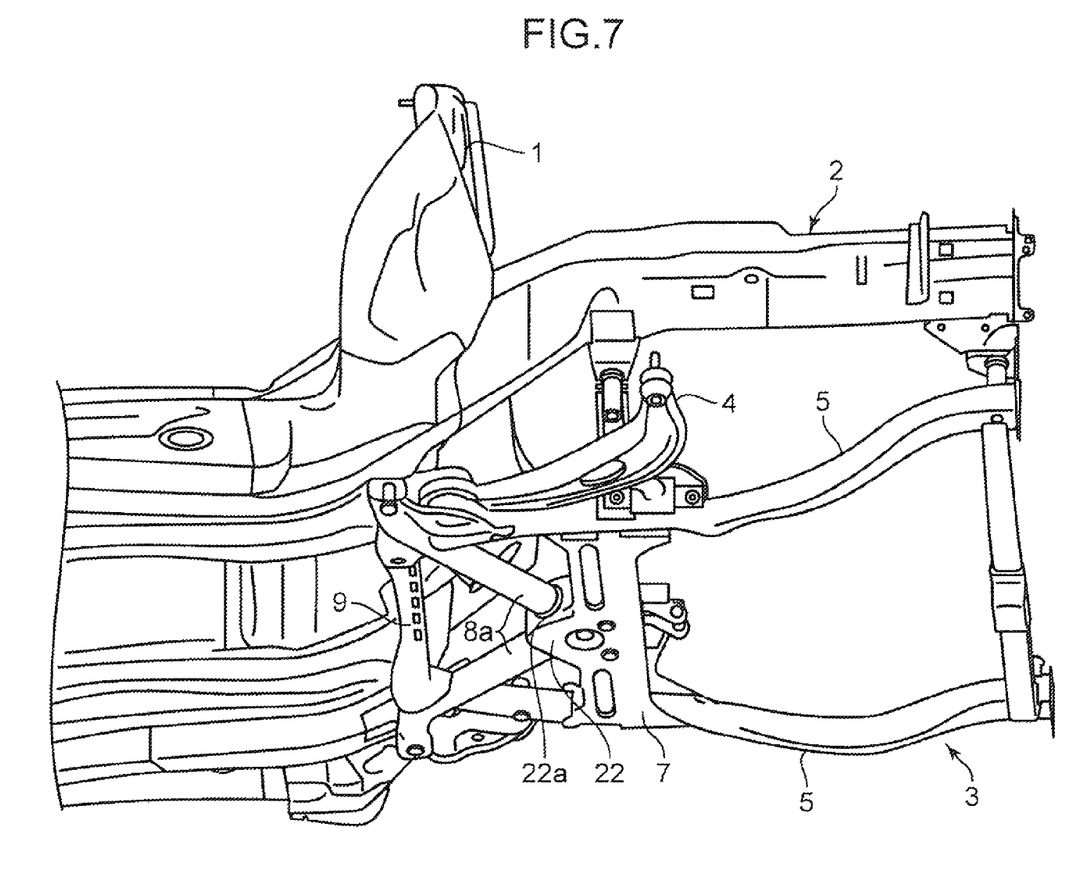
FIG. 7 is a perspective view illustrating a front subframe structure for an automotive vehicle, according to another embodiment of the present invention.

Further, the above embodiment has been described based on an example in which the connection portion 23 provided at the front ends of the right and left oblique members 8 is attached to the oblique-member mounting portions 22 of the central cross member 7, so that the central cross member 7 and the right and left oblique members 8 are integrally coupled together. Alternatively, as illustrated in FIG. 7, each of right and left oblique members 8a may be formed, for example, by using separate round pipes, and may be attached to a pair of upper and lower oblique-member mounting portions 22a individually, by inserting front ends of the oblique members 8a in mounting holes provided in a rear portion of the central cross member 7.

The present invention described above is outlined as follows.

According to one aspect of the present invention, there is provided a front subframe structure for an automotive vehicle. The front subframe structure comprises: a pair of right and left side members each provided with an arm support member for supporting at least a front portion of a suspension arm; a cross member disposed between the left and right side members to extend approximately linearly in a vehicle width direction so as to couple together respective locations in the side members at each of which the arm support member is provided; and an oblique member extending from a vehicle width directional central portion of the cross member, in each of right and left directions of the vehicle and obliquely rearwardly and outwardly in the vehicle width direction, wherein each of the side members has a rear end joined to a rear portion of a respective one of the oblique members, and wherein the rear portion of the oblique member is provided with a tunnel-lower-frame coupling portion configured to be coupled to a tunnel lower frame provided along a lower edge of a floor tunnel formed by causing a vehicle width directional intermediate region of a floor panel to bulge upwardly, and a floor frame attaching portion configured to be attached to a floor frame extending in a front-rear direction of the vehicle along the floor panel.

In the front subframe structure of the present invention, the rear end of each of the side members provided on right and left sides of the front side frame is stably fixed to a vehicle-body frame at a respective one of right and left two positions. Thus, it becomes possible to, during vehicle traveling, transfer an external force, such as a lateral force input from the suspension arm into to one of the side members, to the other side member via the cross member, and then from the other side member to the floor frame and the tunnel lower frame located rearward of the other side member, so as to support the external force. This makes it possible to sufficiently suppress deformation of the front subframe due to an external force such as a lateral force applied thereto, with a simple structure, without causing an increase in size of the front subframe, and effectively improve vehicle traveling stability. In addition, when, in the event of a vehicle collision, a collision load is input into an front end of one of the pair of right and left side members, for example, located on a left side, there is an advantage of being able to transfer the collision load from a left one of the oblique members located rearward of the left side member, to the floor frame and the tunnel lower frame each located on a left side of the vehicle body, via the floor frame attaching portion and the tunnel-lower-frame coupling portion, in a distributed manner, so as to support the collision load, and further transfer the collision load from the central cross member and the right oblique member, to the floor frame and the tunnel lower frame each located on a right side of the vehicle body, via the floor frame attaching portion and the tunnel-lower-frame coupling portion each located rearward of the right oblique member, in a distributed manner, so as to effectively support the collision load. When a collision load is input into an front end of the other side member located on a right side, a collision load can be distributed to right and left sides in the same manner as mentioned above, although only a left-to-right relationship is reversed.

Preferably, in the above structure, the side-member front portion is configured to function as a collision load absorbing section, by undergoing deformation during a vehicle collision.

This structure makes it possible to apply a collision load input in the side member in the event of a vehicle collision, to the side-member front portion in a concentrated manner, while effectively suppressing a situation where the side-member rear portion largely deforms and falls down inwardly according to the collision load, or a situation where the rear end of the side member is separated from the vehicle-body frame according to the collision load, thereby causing the side-member front portion to undergo deformation. Thus, it becomes possible to effectively absorb the collision load to reliably prevent an influence of the collision force from being exerted on the side-member rear portion and an inside of a passenger compartment.

Preferably, the above structure comprises a rear-side arm support member for supporting a rear-side coupling portion of the suspension arm, wherein the rear-side arm support member is bridgingly disposed between a rear portion of each of the side members and the floor frame attaching portion of a corresponding one of the oblique members.

In this structure, the side-member rear portion can be effectively reinforced with a simpler configuration by utilizing the rear-side arm support member, without providing any separate reinforcement member for reinforcing the side-member rear portion. Thus, it becomes possible to easily and satisfactorily ensure a vehicle body rigidity against a collision load in the event of a vehicle collision and an external force such as a lateral force during vehicle traveling, each input in the side-member rear portion and the oblique member, thereby effectively suppressing a situation where the side-member rear portion falls down inwardly according to the collision load. Further, it becomes possible to suppress deformation of the front subframe due to an external force such as a lateral force input from the suspension arm during vehicle traveling, thereby effectively improve vehicle traveling stability.

Preferably, the above structure comprises a rear cross member provided to extend in the vehicle width direction so as to couple the rear portions of the right and left oblique members together, wherein the rear cross member has an up-down directional dimension less than that of each of the oblique members.

This structure makes it possible to effectively suppressing expansive/compressive deformation of the floor tunnel according to an external force such as a lateral force input from the suspension arm into the tunnel lower frame via the front subframe during vehicle traveling, while suppressing a disadvantage, for example, of impairing flexibility in layout of a member such as propeller shaft or an exhaust pipe placed inside the floor tunnel.

Preferably, the structure comprises a torque box coupling a front portion of a side sill placed along each of right and left lateral edges of a passenger compartment of the vehicle, and a front portion of the floor frame, wherein the torque box is provided with a vertical wall or a ridge line extending from a region adjacent to the floor frame attaching portion, outwardly in the vehicle width direction. That is, the structure make it possible to effectively improve the vehicle body rigidity against an external force such as a lateral force during vehicle traveling.

This structure makes it possible to transfer a collision load in the event of a vehicle collision and an external force such as a lateral force during vehicle traveling, each input from the oblique member into the floor frame, to the side sill via the vertical wall and the ridge line constituting a rigid portion of the torque box, in an efficiently distributed manner, so as to support the collision load and the external force, thereby further improving the vehicle body rigidity against the collision load and the external force such as a lateral force.

Preferably, in this structure, each of the side members and the oblique members is formed using a pipe-shaped member.

This structure makes it possible to adequately support both a collision load input into the side member in the event of a vehicle collision, and an external force such as a lateral force input from the suspension arm during vehicle traveling, without causing an increase in size of the front subframe.

Preferably, in this structure, a front end of the floor frame and a front end of the tunnel lower frame are coupled together through the floor frame attaching portion and the tunnel-lower-frame coupling portion provided in the rear portion of each of the oblique members, wherein the frame attaching portion, the tunnel-lower-frame coupling portion and the floor panel are arranged to define thereamong an opening corresponding to up-down directional dimensions of the floor frame and the tunnel lower frame.

This structure makes it possible to allow a harness wired along between the floor frame and the tunnel lower frame to be easily led into the engine compartment through the opening. Further, it becomes possible to couple together the front end of the floor frame and the front end of the tunnel lower frame through the floor frame attaching portion and the tunnel-lower-frame coupling portion, to thereby sufficiently reinforce the floor frame and the tunnel lower frame, and transfer a collision load in the event of a vehicle collision and an external force such as a lateral force during vehicle traveling, each input into the oblique member, to the floor frame and the tunnel lower frame via the floor frame attaching portion and the tunnel-lower-frame coupling portion, to thereby effectively support the collision load and the external force.

INDUSTRIAL APPLICABILITY

The aforementioned front subframe structure of the present invention is capable of stably supporting a load such as a lateral force input from a suspension arm, with a simple and compact configuration, and satisfactorily ensuring a vehicle body rigidity against a collision load input in the event of a vehicle collision. Thus, the front subframe structure becomes useful in a lower body structure for a vehicle.

What is claimed is:

1. A front subframe structure for an automotive vehicle, comprising:
  a pair of right and left side members each extending in a front-rear direction of the vehicle, each of the side members being composed of a pipe-shaped member, and provided with a front-side arm support member for supporting a front portion of a suspension arm and a rear-side arm support member for supporting a rear portion of the suspension arm;
  a central cross member disposed between the left and right side members to extend approximately linearly in a vehicle width direction so as to couple together respective locations in the side members at each of which the front-side arm support member is provided;
  a pair of right and left oblique members each extending from a vehicle width directional central portion of the central cross member, in a respective one of right and left directions of the vehicle and obliquely rearwardly and outwardly in the vehicle width direction, each of the oblique members being formed as a single member using a single piece of pipe-shaped member; and
  a rear cross member extending in the vehicle width direction so as to couple the right and left oblique members together,
  wherein:
  each of the rear-side arm support member and the central and rear cross members is formed using a pair of upper and lower plate-shaped members;
  each of the oblique members has a floor frame attaching portion provided at a rear end thereof and configured to be attached to a floor frame extending in a front-rear direction of the vehicle along a floor panel;
  each of the side members has a rear end joined to a respective one of the oblique members at a position forward of the floor frame attaching portion;

the rear cross member has a tunnel-lower-frame coupling portion configured to be coupled to a tunnel lower frame provided along a lower edge of a floor tunnel formed by causing a vehicle width directional intermediate region of the floor panel to bulge upwardly; and the rear-side arm support member is bridgingly disposed between a rear portion of each of the side members and the floor frame attaching portion of a corresponding one of the oblique members.

2. The front subframe structure as defined in claim 1, wherein front portions of the side members are configured to function as a collision load absorbing section.

3. The front subframe structure as defined in claim 1, wherein the rear cross member is configured such that opposite ends thereof are joined, respectively, to the oblique members, and wherein each of the opposite ends has the tunnel-lower-frame coupling portion.

4. The front subframe structure as defined in claim 3, wherein each of the opposite ends of the rear cross member is formed to have a front-rear directional width greater than that of a vehicle width directional central portion of the rear cross member.

5. The front subframe structure as defined in claim 3, wherein the rear end of each of the side members is joined to a front surface of a corresponding one of the oblique members, and wherein a corresponding one of the opposite ends of the rear cross member is joined to a rear surface of the corresponding oblique member in such a manner that the corresponding oblique member is sandwiched between the rear end of the side member and the corresponding end of the rear cross member, in the front-rear direction.

6. The front subframe structure as defined in claim 1, wherein the rear end of each of the oblique members is bent with respect to a portion of the oblique member forward of the rear end in such a manner that the rear end extends outwardly in the vehicle width direction, whereby the rear end serves as the floor frame attaching portion.

7. The front subframe structure as defined in claim 1, wherein the tunnel-lower-frame coupling portion of the rear cross member lies on a rearward extension line of each of the side members.

8. The front subframe structure as defined in claim 1, which comprises:

a connection portion provided between the pair of right and left oblique members to extend in the vehicle width direction so as to connect front end portions to each other of the pair of right and left oblique members, wherein the pair of right and left oblique members and the connection portion are formed as a single member using a single piece of pipe-shaped member; and a pair of upper and lower oblique-member mounting portions integrally provided in a vehicle width directional intermediate region of the central cross member to protrude rearwardly, wherein the connection portion is joined to the oblique-member mounting portions, while being clamped and held between the oblique-member mounting portions.

9. The front subframe structure as defined in claim 1, wherein each of the pair of right and left side members comprises a side-member rear portion extending rearwardly from the location of the front-side arm support member, and a side-member front portion extending forwardly from the location of the front-side arm support member, wherein the side-member rear portion has a rear region extending obliquely rearwardly and inwardly in the vehicle width direction, and the side-member front portion extends from a front end of the side-member rear portion, forwardly and obliquely outwardly in the vehicle width direction.

\* \* \* \* \*